US006786225B1

(12) United States Patent
Stark et al.

(10) Patent No.: US 6,786,225 B1
(45) Date of Patent: Sep. 7, 2004

(54) THREE-STAGE RELAY CONTROL

(75) Inventors: Mark H. Stark, St. Louis, MO (US);
John J. Love, St. Louis, MO (US);
Mike C. Santinanavat, Chesterfield, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/712,896

(22) Filed: Nov. 15, 2000

(51) Int. Cl.[7] ............................. F16K 31/10; G05D 7/06

(52) U.S. Cl. ............................. 137/1; 137/66; 137/489; 251/30.01; 251/129.18; 251/129.2; 126/116 A; 236/1 A; 431/12; 431/62

(58) Field of Search ........................ 251/30.01, 129.02, 251/129.18, 129.2; 126/116 A; 431/12, 62, 63, 75; 137/66, 489, 505.14, 1, 82, 85; 236/1 A, 1 EB

(56) References Cited

U.S. PATENT DOCUMENTS

| | | | |
|---|---|---|---|
| 1,527,275 A | 2/1925 | Ruths et al. | |
| 1,718,290 A | 6/1929 | Groble | |
| 2,247,060 A | 6/1941 | Levine et al. | |
| 2,291,731 A | 8/1942 | Lake et al. | |
| 2,814,447 A | * 11/1957 | Greenamyer | 236/48 R |
| 3,058,665 A | * 10/1962 | Ray | 236/20 R |

(List continued on next page.)

OTHER PUBLICATIONS

White–Rodgers Brochure, "Integrated Furnace Controls".
White–Rodgers Brochure, "Gas Burner Controls".
White–Rodgers Brochure, "Heat Pump—1F92W–51/1F92–71/1F94–71/1F94W–71/1F94–180 Digital Comfort-–Set II Heat Pump Thermostats".
White–Rodgers Brochure, "White–Rodgers 1F91–71 Digital Multi–Stage Thermostat, Now with Built–In Remote Sense Capability".
White–Rodgers Brochure, "White–Rodgers 1F95–71 Digital 7–Day Multi–Stage Thermostat, Now with Built–in Remote Sense Capability".
White–Rodgers Brochure, "White–Rodgers 1F90 Digital Comfort–Set II Single Stage Thermostat".
White–Rodgers Brochure, "White–Rodgers 1F97 Digital Comfort–Set II Single Stage Thermostats".
White–Rodgers Brochure, "White–Rodgers 1F8X Series Digital Heat Pump Thermostats".
White–Rodgers Brochure, "White–Rodgers Comfort–Set III Premium Digital Thermostats".
White–Rodgers Brochure, "White–Rodgers Comfort–Set III Deluxe Digital Thermostats".
White–Rodgers Brochure, "White–Rodgers 1F8X–71 Series Digital Multi–Stage Thermostats".
White–Rodgers Brochure, "White–Rodgers 1F8X–51 Series Digital Multi–Stage Thermostats".
White–Rodgers Brochure, "Comfort–Set II Thermostats—1F90/1F97 Models—Digital Comfort–Set II Single Thermostats".
White–Rodgers Brochure, "Comfort–Set II Thermostats—1F91–71/1F95–71/1F95–80 Digital Comfort–Set II Multi Stage Thermostats".

*Primary Examiner*—Ramesh Krishnamurthy
(74) *Attorney, Agent, or Firm*—Harness Dickey

(57) ABSTRACT

A three-stage relay control is provided for regulating the flow of gas through, for example, gas valves. The relay control includes a control arm for providing three levels of gas flow and having three adjustment screws, one for controlling the flow at each stage of operation. The control arm preferably pivotally rotates to provide the three gas flow levels. Energizing the relay control at three different amperage levels provides the three-stages. At a low-flow stage, the relay is de-energized. At a high-flow stage, the relay is fully energized. At a mid-flow stage, between the high-flow and low-flow stage, the relay is energized at an intermediate amperage.

58 Claims, 2 Drawing Sheets

U.S. PATENT DOCUMENTS

| | | | | |
|---|---|---|---|---|
| 3,317,136 A | * | 5/1967 | Stang, Jr. et al. | 236/78 R |
| 3,486,693 A | * | 12/1969 | Stang, Jr. et al. | 236/9 A |
| 3,726,473 A | * | 4/1973 | Sapir | 236/11 |
| 3,912,161 A | * | 10/1975 | Harding et al. | 236/1 A |
| 4,060,370 A | * | 11/1977 | Fleer | 431/62 |
| 4,085,921 A | * | 4/1978 | Ueda et al. | 251/129.08 |
| 4,254,796 A | | 3/1981 | Kelly | |
| 4,265,270 A | * | 5/1981 | Satoh | 137/505.39 |
| 4,268,009 A | * | 5/1981 | Allen, Jr. | 251/129.2 |
| 4,406,400 A | | 9/1983 | Berkhof | |
| 4,474,212 A | * | 10/1984 | Schmitz | 137/614.11 |
| 4,850,530 A | | 7/1989 | Uecker | |
| 4,921,011 A | * | 5/1990 | Kelly et al. | 137/595 |
| 4,932,430 A | * | 6/1990 | Fernstrom | 137/85 |
| 5,413,141 A | | 5/1995 | Dietiker | |
| 5,435,343 A | * | 7/1995 | Buezis | 137/489 |
| 5,941,699 A | * | 8/1999 | Abele | 431/80 |
| 6,029,705 A | * | 2/2000 | Happe | 137/630.19 |
| 6,179,212 B1 | * | 1/2001 | Banko | 236/1 E |
| 6,192,913 B1 | * | 2/2001 | Willey et al. | 137/66 |
| 6,283,145 B1 | * | 9/2001 | Fenn | 137/489 |
| 6,308,895 B1 | * | 10/2001 | Atxa et al. | 237/2 A |
| 6,352,428 B1 | * | 3/2002 | Uribetxebarria et al. | 431/80 |

* cited by examiner

THREE-STAGE RELAY CONTROL

FIELD OF THE INVENTION

The present invention relates to controls for gas valves, and more particularly to an adjustable relay control having three-stage operation for regulating flow through a gas valve.

BACKGROUND OF THE INVENTION

Most homes today use a single stage heating, ventilating and air-conditioning (HVAC) system for controlling climate conditions within the homes. With respect to heating, when in heating mode, these systems are either full "on" or "off" depending upon user-defined settings provided to a thermostat, which controls operation of the HVAC system. Thus, the system will provide either high heat, when heat is needed, or no heat when the particular user defined temperature settings have been satisfied. The problem is that the system provides only one mode of operation, which is not very economical. These single stage systems do not distinguish between a condition when the difference between the actual and desired set-point temperature is small (i.e., low heat is needed), and when that difference is large (i.e., high heat is needed). Thus, not only is energy wasted (i.e., high heat is activated even if the temperature difference is small, oftentimes resulting in "over-shooting" the desired temperature), but every time the system is activated, the blower fan is turned on "high" with a noticeable level of noise to occupants of a home.

More economical systems were developed and are known that provide two-stages of operation. Therefore, depending upon the temperature demands as determined by a thermostat, the system provides heat at either a high level or low level. For example, if the thermostat is set such that during the day the home is kept cooler (i.e., temperature is set-back while occupants of house are at work), when the system demands heat later in the day, prior to the occupants returning, to satisfy the thermostat settings, high heat is provided to rapidly warm the home (i.e., gas valve of the heating system provides full flow and blower fan is high) until the room temperature is near the desired set-point temperature. Thereafter, the second-stage provides low heat (i.e., the gas valve of the heating system provides low flow and the fan blower is low), and will continue to do so each time a small deviation from the actual temperature occurs and a demand for heat is made. Thus, the system is both efficient in high heat stage, and economical in low heat stage. Additionally, the low heat stage is much more quiet in operation than the high heat stage. However, because the high heat stage operates until room temperature is near the set-point temperature, the cost of operation (i.e., gas cost) is not greatly reduced. Also, the system still operates at full heat until the set-point temperature is almost met, thus resulting in noticeable operating noise (i.e., fan blower operation) during most of the heating system's operation period and possible over-shoot in temperature.

SUMMARY OF THE INVENTION

What is needed is a system that allows for adjustable operation in multiple stages, which not only reduces operating costs, but minimizes operating noise. The present invention solves these needs by providing a system that includes three-stages of heating: a low heat operating level (low gas flow level and blower is at low speed), a high heat operating level (full gas flow level and blower is at high speed) and a mid-heat operating level (mid-flow of gas and blower is at intermediate speed).

Essentially, the present invention provides a three-stage relay control for regulating gas valves at three levels of operation (i.e., three different outlet gas levels or pressures). However, although the present invention will be described in combination with a gas valve for a furnace, it should be appreciated that the present invention may be used in conjunction with other gas devices, such as boilers, space heaters, water heaters, log flame valves and clothes dryers, to name only a few other applications.

More specifically, the relay control of the present invention preferably controls the operation of the servo-regulator of a gas valve and may be operated at three energy levels: off, middle and high. A solenoid or coil of the relay control is energized in one of these three energy levels depending upon the heating demands of the system.

A control arm that is part of the relay control pivots as a result of a magnetic field generated by the coil, and operates in conjunction with a plurality of adjustment screws and the servo-regulator, to regulate the level of gas flow at the gas valve outlet. Thus, the rate of gas flow is provided at three different stable levels. Preferably, a low-flow adjustment screw, a mid-flow adjustment screw and a high-flow adjustment screw are provided to set the desired opening of the gas valve in each of the three flow states. Additionally, a biasing or control spring is also provided in connection with the control arm to provide proper gas valve operation in each of the three stages.

While the principal advantages and features of the present invention have been explained above, a more complete understanding of the invention may be attained by referring to the description of the preferred embodiments which follow.

DETAILED DESCRIPTION OF PREFERRED EMBODIMENTS

A relay control or relay-controlled regulator constructed according to the principles of the present invention is shown and described in conjunction with a gas valve for use with a gas furnace. Of course, the relay control could also be provided in conjunction with other gas devices as described herein.

Figure 1:
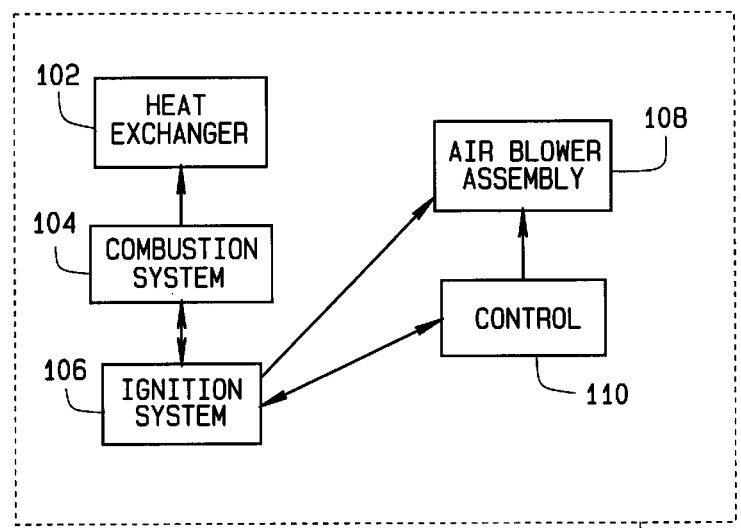
FIG. 1 is a block diagram showing the component parts of a typical furnace for use in connection with an HVAC system in which a relay control constructed according to the principles of the present invention may be implemented.

As shown in FIG. 1, a typical gas furnace system 100 includes a heat exchanger 102, a combustion system 104, an ignition system 106, an air blower assembly 108 and an operator control 110 (e.g., a thermostat). The operator control 110, which is programmed or configured by a user, operates the various aspects of an HVAC system, including a furnace system 100. This operation includes, for example, activation of gas furnace heating, which requires the opening of a gas valve to provide gas flow to an ignitor.

Typically, the ignition system 106 includes an ignition control that is activated by a thermostat 110 based upon user settings. For example, when the thermostat demands more heat, the ignition control will activate the combustion system 104 (i.e., open the gas valve for ignition of gas) and the air blower assembly 108 (i.e., the blower fan) accordingly. Based upon the request for heat from the thermostat, the ignition control preferably controls not only the motor speed of the blower fan, but also controls the activation of the gas valve and the corresponding gas flow. The ignition control may be incorporated as part of an integrated furnace control, which furnace control may be for example the 50A50 Integrated Furnace Control manufactured and sold by the White-Rodgers Division of Emerson Electric Co. An integrated ignition system also may be provided as part of a furnace control, giving added control of the gas valve. The integrated ignition system may be the 50A65 Silicon Nitride Intell-Ignition™ system manufactured and sold by the White-Rodgers Division of Emerson Electric Co.

The three-stage relay control of the present invention for regulating the flow of gas through a gas valve is preferably operable in each stage by application of a different energization or amperage level to the relay control. It should be noted that the application of a different energization level for operation at each stage may also be provided by different voltage levels. Therefore, the thermostat 110 controlling the ignition system 106 is preferably configurable to provide three-stage gas heating, which thermostat may be the 1F93-380 Comfort-Set® III Multi-Stage Thermostat manufactured and sold by the White-Rodgers Division of Emerson Electric Co.

Figure 2:
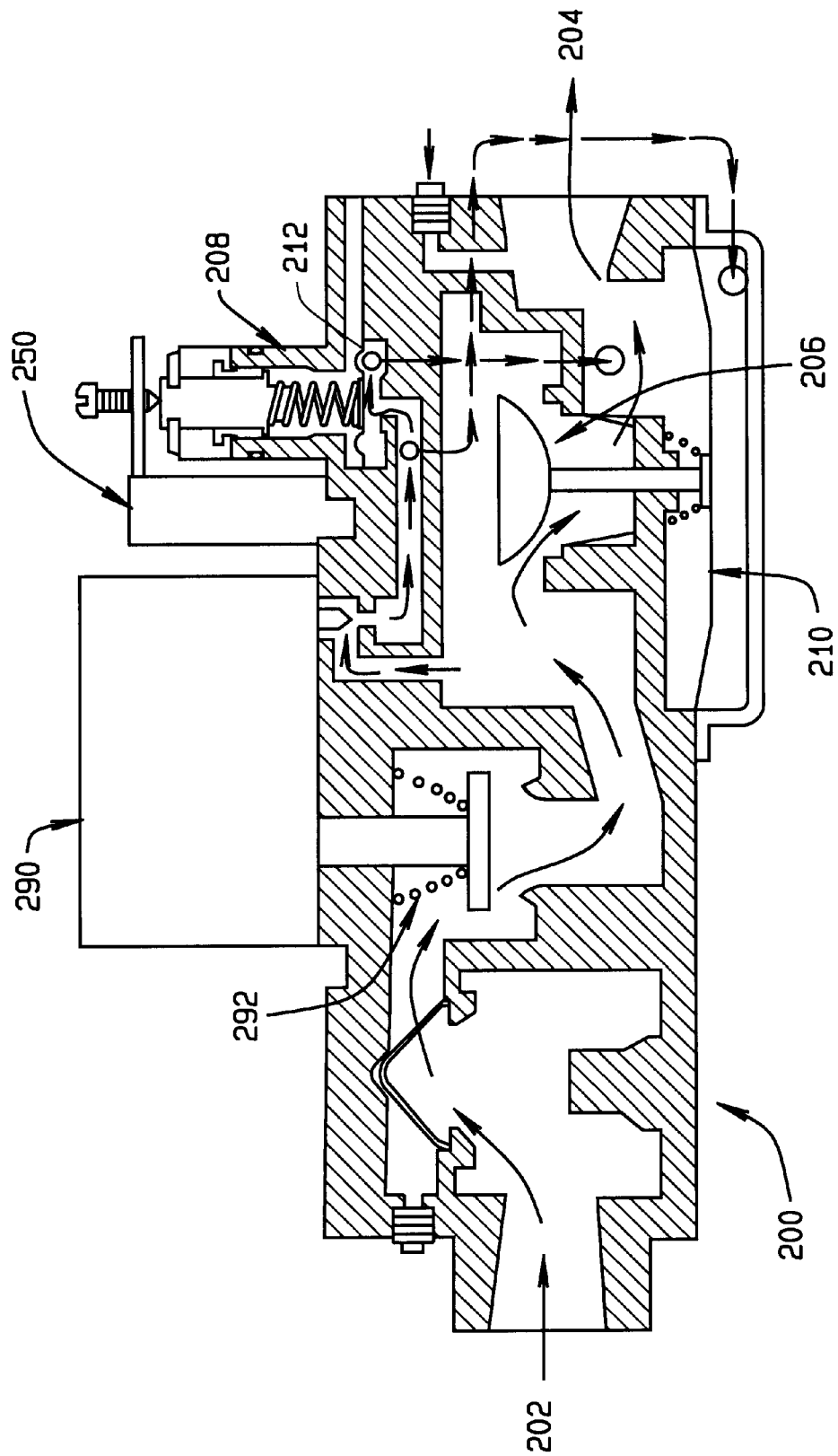
FIG. 2 is a schematic diagram of a typical gas valve with a relay control constructed according to the principles of the present invention connected thereto.

A typical gas valve that may be controlled by the three-stage relay control of the present invention is shown in FIG. 2 and indicated generally by 200. The gas valve 200 basically comprises an inlet 202, an outlet 204, a main valve 206 controlling flow through the gas valve, and a servo-regulator 208 for regulating the operation of the main valve 206. The gas valve of the present invention may be rated, for example, from 40,000 to 200,000 BTU per hour flow with natural gas, and from 40,000 to 250,000 BTU per hour flow with Liquid Propane (L.P.) Gas. The three-stage relay control of the present invention for use in conjunction with, for example, a gas valve 200, is indicated generally as 250 in FIG. 3, and shown in preferable operative connection with the servo-regulator 208 of the gas valve in FIG. 2.

In operation, the size of the opening of the main valve 206 is electrically controlled and set by the three-stage relay control 250 in conjunction with the servo-regulator 208. A diaphragm 210 is also typically used in combination with the servo-regulator 208 to control the size of the opening of the main valve 206, thereby controlling the flow of gas at the outlet 204. It should be noted that the operation of the gas valve 200, including that of the servo-regulator 208, main valve 206 and diaphragm 210 are known to those skilled in the art. Essentially, the three-stage relay control 250 of the present invention operates in conjunction with the servo-regulator 208 of a gas valve 200 to provide three different opening levels of the main valve 206, thereby resulting in three levels of gas flow at the outlet 204. It should be noted that the opening levels are not fixed, and may vary with changes in inlet gas pressure to maintain the desired level of flow.

Referring again and more specifically to FIG. 3, the three-stage relay control 250 of the present invention generally comprises a control arm or armature 252, a low-flow adjustment screw 254, a mid-flow adjustment screw 256 and a high-flow adjustment screw 258. Each of the adjustment screws preferably provide for setting the gas flow rate for a corresponding stage of operation of the gas valve 200, by controlling the servo-regulator 208. It should be noted that any suitable adjustable or configurable member may be provided and substituted for the adjustment screws.

The three-stage relay control 250 preferably includes a bracket or connecting member 260 for connecting the relay control 250 to the gas valve 200. In the most preferred embodiment, the relay control 250 is connected such that the high-flow adjustment screw 258 is aligned and in operative connection with a piston 262 of the servo-regulator 208. The piston 262 is movable in conjunction with a regulator spring 264 to control the expansion of diaphragm 212, thereby controlling the expansion of diaphragm 210 and the movement and positioning of the main valve 206. Thus, the vertical position of the high-flow adjustment screw 258 controls the compression of the regulator spring 264, thereby controlling the outlet flow of the gas valve 200 through the main valve 206.

With respect to the three stages of operation of the relay control 250, a low-flow, a mid-flow and a high-flow state of the gas valve 200 are preferably provided. Each of these states correspond to a different energization level of the relay control 250: (1) off (not energized)=low-flow; (2) intermediate amperage=mid-flow; and (3) full amperage (fully energized)=high-flow.

The low-flow (de-energized) state is provided when coil 266 is de-energized (i.e., zero amperage is applied to the coil terminals 272 of the relay control 250). In this state, a control spring 268 provides downward tension or force on the control arm 252, which control arm 252 is preferably pivotally connected at 270. In this low-flow state, the control spring 268 pivots the control arm 252 until it contacts the low-flow adjustment screw 254. This pivoting action causes the high-flow adjustment screw 258, which is in contact with the servo-regulator piston 262, to move upward, thereby causing the regulator spring 264 to decompress. This results in a low-flow state of the gas valve 200, which results from the movement of diaphragm 212 and diaphragm 210 in response to the decompression of the servo-regulator spring 264 as is known in the art. This low-flow state is defined by an opening of the main valve 206 that will provide an outlet pressure preferably between 0.5 to 2.1 inches Water Column (W.C.) which correlates with 32 to 65 percent of full flow for natural gas (or 1.1 to 4.7 inches W.C. which correlates with 32 to 65 percent of full flow for L.P. gas), thereby providing low-flow communication between the inlet 202 and the outlet 204.

It should be noted that in this state the high-flow adjustment screw 258 remains in contact with the servo-regulator piston 262. A stable gas valve condition having a low flow of gas that is adjustable using the low-flow adjustment screw 254 is thereby provided. This low-flow state is preferably activated when the difference between the actual room temperature, as measured by the thermostat 110, and the set-point temperature as defined by the user is preferably between approximately 0 to 1 degrees Fahrenheit.

Figure 3:
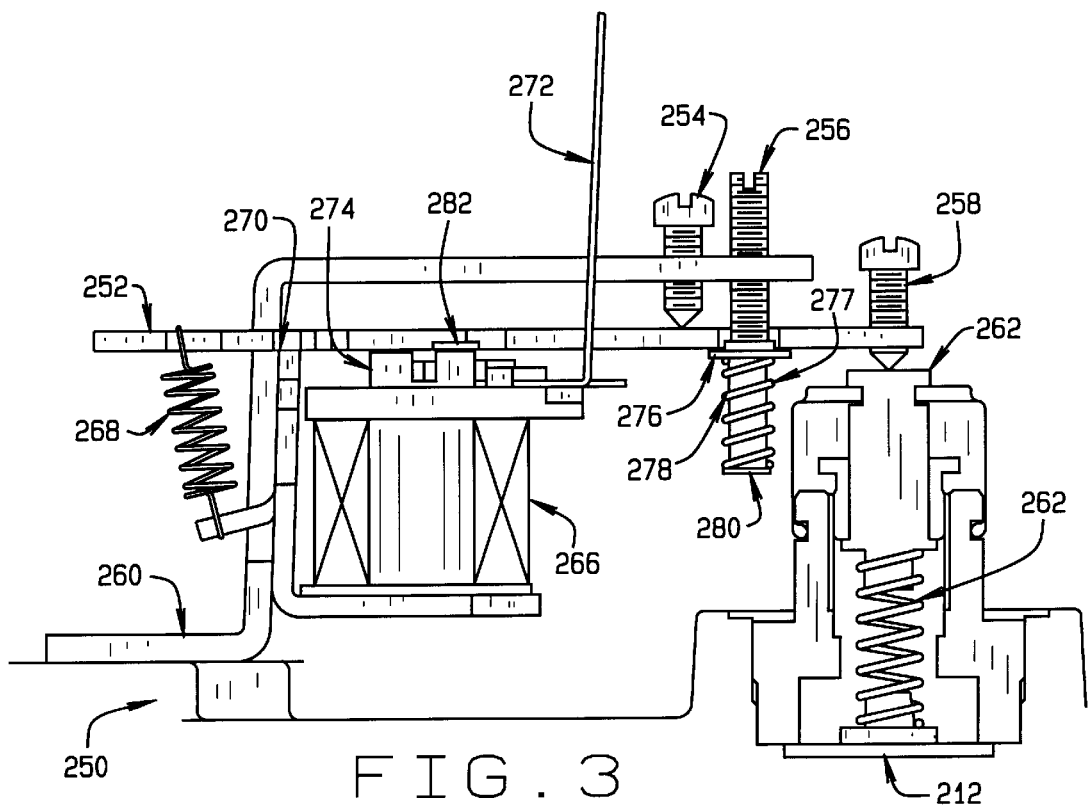
FIG. 3 is a partial vertical cross-sectional view of a relay control constructed according to the principles of the present invention.

The high-flow (fully energized) state is provided when rated full amperage is applied to coil terminals 272, which generates a magnetic field around the coil 266 and reduces the gap between the core 274 and the control arm 252 due to the pivotal rotation of the control arm 252. The field generated by the application of full rated amperage to the coil terminals 272 which causes the pivotal rotation of the control arm 252 is sufficient to overcome the spring force from the control spring 268 and rotate the control arm 252 clockwise (as viewed in FIG. 3) until it contacts a three-stage washer 276. As shown in FIG. 3, the three-stage washer 276 is preferably supported and pre-loaded on a lower portion 277 of the mid-flow adjustment screw 256 by a coil spring 278, which together are held in place on the lower portion 277 by shoulder 280. This three-piece assembly (i.e., three-stage washer 276, lower portion 277 of the mid-flow adjustment screw 256 and coil spring 278) is preferably adjustably connected to the mounting bracket 260 using the threads of the mid-flow adjustment screw 256.

In the high-flow state, the magnetic force generated by the magnetic field around the coil 266 is also preferably sufficient for the control arm 252 to overcome the spring force of the coil spring 278. This causes the three-stage washer 276 to slide axially downward along the lower portion 277 of the mid-flow adjustment screw 256 (as viewed in FIG. 3), thereby further compressing the coil spring 278. The control arm 252 is pivotally rotated until it contacts the core 274. In an alternate embodiment, the control arm 252 includes a stop 282, provided on the control arm 252, which contacts the core 274. The stop 282 is preferably constructed of a non-magnetic material and maintains a control gap between the control arm 252 and the core 274.

The pivotal movement of the control arm 252 also causes the high-flow adjustment screw 258, which is in contact with the servo-regulator piston 262 to further compress the regulator spring 264, thereby causing the main valve 206 to further open in a known manner as described herein. Thus, a stable high-flow state is provided with the main valve 206 open at a level that will provide an outlet pressure preferably between 3 to 5 inches W.C. which correlates with 78 to 100 percent of full flow for natural gas (or 6.7 to 11 inches W.C. which correlates with 78 to 100 percent of full flow for L.P. gas). The size of the opening provided by the main valve 206 is adjustable using the high-flow adjustment screw 258, which adjustment causes a change in the flow rate at the outlet 204. This high-flow state is preferably activated when the difference between the actual room temperature, as measured by the thermostat 110, and the set-point temperature as defined by the user is preferably at least 5 degrees Fahrenheit or more.

The mid-flow (intermediate amperage) state is provided when a amperage less than the rated full amperage is applied to coil terminals 272, which generates a magnetic field around the coil 266, pivotally rotating the control arm 252 and thereby reducing the gap between the core 274 and the control arm 252. In this state, the magnetic force generated by the magnetic field is sufficient to overcome the spring force of the control spring 268 and cause the control arm 252 to pivot at 270 and rotate clockwise (as shown in FIG. 3) until contact is made with the three-stage washer 276. However, the magnetic force generated by the magnetic field at this selected intermediate amperage is insufficient to overcome the spring force of the coil spring 278. Thus, further rotation of the control arm 252 is prevented, which thereby causes the servo-regulator piston 262, which is in contact with the high-flow adjustment screw 258, to stop compressing the regulator spring 264.

Therefore, the opening of the main valve 206 is also stopped, and an intermediate main valve 206 opening is provided, such that an outlet pressure preferably between 1.8 to 3.6 inches W.C. which correlates with 60 to 85 percent of full flow for natural gas (or 4 to 8 inches W.C. which correlates with 60 to 85 percent of full flow for L.P. gas), is provided. A stable mid-flow state is provided to the gas valve 200, which can be adjusted using the mid-flow adjustment screw 256. It should be noted that this mid-flow state is provided from the low-flow state in the preferred embodiment. In an alternate embodiment, this mid-flow state may be provided directly from either the low-flow or high-flow state due in part to the inclusion of the stop 282. This mid-flow state is preferably activated when the difference between the actual room temperature, as measured by the thermostat 110, and the set-point temperature as defined by the user is preferably between approximately 1 to 5 degrees Fahrenheit.

Therefore, in operation, with the coil 266 fully energized (full rated amperage) using the coil terminals 272, the relay control 250 provides a full-flow level at the gas valve 200 outlet 204. When the coil 266 is not energized (zero amperage), the relay control 250 provides a low-flow level at the gas valve 200 outlet 204. When the coil is energized at an intermediate amperage, which is less than full rated amperage (preferably 35 percent or less of full rated amperage), the relay control 250 provides a mid-flow level at the gas valve 200 outlet 204. It should be noted that the initial opening and closing of the main valve 206 is typically provided by the energization and de-energization of a single coil 290 as shown in FIG. 2. Thus, the size of the opening provided by the main valve 206 (i.e., the flow level from the inlet 202 to the outlet 204) is controlled by the relay control 250, while the opening and closing of a redundant valve 292 (i.e., opening or closing of communication flow through the gas valve 200) is controlled by the single coil 290.

With respect to setting the flow level at each of the operating stages, for the high-flow state, the coil 266 of the relay control 250 is energized with full rated amperage and the desired flow at the outlet 204 is adjusted with the high-flow adjustment screw 258. For the low-flow state, the coil 266 of the relay control 250 is de-energized and the desired flow at the outlet 204 is adjusted with the low-flow adjustment screw 254. For the mid-flow state, the coil 266 of the relay is energized to preferably approximately 35 percent of full rated amperage and the desired flow at the outlet 204 is adjusted with the mid-flow adjustment screw 256. It should be noted that the coil spring 278 is preferably provided such that it prevents movement of the three-stage washer 276 up to approximately 65 percent of full rated amperage. The coil spring 278 and the control spring 268 may be selected depending upon their characteristics and as required by the particular application.

Thus, in operation, the thermostat 110 determines the amount of heat required from the furnace system 100 based upon user defined set-point temperature, and provides for the activation of the relay control 250 of the present invention using the ignition system 106. For example, if a user programs the following schedule in the thermostat 110, the three-stage relay control 250 of the present invention will preferably operate as described below:

| TIME OF DAY | SET-POINT TEMPERATURE | ACTUAL TEMPERATURE |
| --- | --- | --- |
| 7:00 AM | 72° F. | 72° F. |
| 8:00 AM | 64° F. | 72° F. |
| 9:00 AM | 64° F. | 69° F. |
| 12:00 PM | 64° F. | 65° F. |
| 4:00 PM | 64° F. | 63° F. |
| 6:00 PM | 72° F. | 64° F. |
| 6:15 PM | 72° F. | 68° F. |
| 6:25 PM | 72° F. | 71° F. |
| 6:30 PM | 72° F. | 72° F. |
| 11:00 PM | 68° F. | 72° F. |

At 7:00 AM the temperature in the house is the same as the set-point temperature and no demand for heat is needed.

At 8:00 AM the thermostat is set-back (either automatically or manually) to 64° F. while the occupants of the house are away (e.g., at work). During the day (i.e., from 8:00 AM until 4:00 PM) the house cools. At 4:00 PM the actual temperature is below the set-point temperature and the thermostat 110, using the ignition system 106 will activate the relay control 250 at the low-stage, after initial ignition at a higher stage, because the difference between the actual and set-point temperature is only 1° F.

At 6:00 PM the set-point temperature is increased to 72° F., again either automatically or manually, typically because the occupants of the house will be returning (e.g., back home from work). At this time, because the difference between the actual and set-point temperature is 8° F., the relay control 250 is activated at its high-flow stage, thereby resulting in high heat (i.e., gas valve's 200 main valve 206 at full flow level and blower fan of air blower assembly 108 activated at high speed). At 6:15, the actual temperature has increased to 68° F. as a result of the high heat. The difference between the actual and set-point temperature is now only 4° F. and the relay control 250 is activated at its mid-flow stage, thereby resulting in intermediate heat (i.e., gas valve's 200 main valve 206 at mid-flow level and blower fan of air blower assembly 108 activated at intermediate speed). By 6:25 PM the actual temperature is 71° F., which is only 1° F. from the set-point temperature. At this point, the relay control 250 is activated at its low-flow stage, thereby resulting in low heat (i.e., gas valve's 200 main valve 206 at low-flow level and blower fan of air blower assembly 108 activated at low speed). At 11:00 PM the set-point temperature is again set-back as the occupants of the house are asleep. The house will cool to this temperature and when a difference is detected, the relay control 250 will be activated accordingly.

It should be apparent that the relay control 250 of the present invention may be implemented with various gas devices using different gas types (e.g., natural gas or L.P. gas). Additionally, different gas valves may be substituted for the gas valve 200 or component parts substituted. The invention herein described may be configured to provide three-stage control of any such valve. For example, the bracket 260 may be modified depending upon the configuration of the valve. Additionally, the control spring 268 and/or coil spring 278 may be replaced with ones having different spring characteristics as required by the particular application. Further, the high-flow adjustment screw 262 may be replaced with another suitable adjustable member for connection to the control or regulator of that particular device.

There are other various changes and modifications which may be made to the particular embodiments of the invention described herein, as recognized by those skilled in the art. However, such changes and modifications of the invention may be constructed without departing from the scope of the invention. Thus, the invention should be limited only by the scope of the claims appended hereto, and their equivalents.

What is claimed is:

1. A control for regulating the flow through a gas valve, the control comprising:
   a flow regulator operated by the relative position of a single control arm operable about a pivot between at least three positions to select at least three flow rates; and
   a plurality of adjustment members for setting at least three different flow levels through the gas valve as regulated by the flow regulator using the control arm; each adjustment member associated with a corresponding flow level.

2. The control according to claim 1 wherein a first adjustment member is configured in combination with the flow regulator to provide a first flow level through the gas valve, a second adjustment member is configured in combination with the flow regulator to provide a second flow level through the gas valve, and a third adjustment member is configured in combination with the flow regulator to provide a third flow level through the gas valve.

3. The control according to claim 2 further comprising an energization member for activating the flow regulator to thereby provide each of the flow levels, and wherein a different energization level is provided for each of the flow levels.

4. The control according to claim 3 further comprising a connection member for connecting the control arm to the gas valve.

5. The control according to claim 4 further comprising a biasing member connected to the control arm.

6. A three-stage relay adjustably configurable for regulating the outlet flow of a gas valve at three different flow levels, the three-stage relay comprising:
   a single control arm operatively connected to the gas valve and configured for operating the gas valve in each of the three stages;
   a first adjustment member configured to operate in conjunction with the control arm to provide a first level of outlet flow;
   a second adjustment member configured to operate in conjunction with the control arm to provide a second level of outlet flow; and
   a third adjustment member configured to operate in conjunction with the control arm to provide a third level of outlet flow.

7. The three-stage relay according to claim 6 further comprising a control spring connected to the control arm for biasing the control arm.

8. The three-stage relay according to claim 7 wherein the first adjustment member is a first adjustable screw and in conjunction with the control arm provides a low outlet flow.

9. The three-stage relay according to claim 8 wherein the second adjustment member is a second adjustable screw and in conjunction with the control arm provides a high outlet flow.

10. The three-stage relay according to claim 9 wherein the third adjustment member is a third adjustable screw and in conjunction with the control arm provides an outlet flow greater than the low outlet flow and less than the high outlet flow.

11. The three-stage relay according to claim 6 wherein the gas valve includes a regulator with the control arm operatively connected to the regulator for providing the three gas flow levels.

12. In combination with a gas valve having a regulator, a relay assembly providing three different gas valve output levels, the relay assembly comprising:
   a single control arm configured for operation in conjunction with the regulator for providing the three different gas valve output levels; and
   a plurality of adjustment members, each adjustment member corresponding to a position of the control arm, to provide one of the three different gas valve output levels.

13. The relay assembly according to claim 12 wherein a first adjustment member is configured to set a first gas valve output level, a second adjustment member is configured to set a second gas valve output level, and a third adjustment member is configured to set a third gas valve output level.

14. The relay assembly according to claim 13 wherein the adjustment members are adjustable screws, each of which is settable within a range for configuring each of the gas valves output levels.

15. The relay assembly according to claim 13 further comprising an energizable member configured to activate at different energization levels, and in conjunction with the adjustment members, to provide for operating the gas valve at each of the gas valve output levels corresponding to a different energization level.

16. The relay assembly according to claim 15 wherein the different energization levels are different amperage levels.

17. The relay assembly according to claim 15 wherein the different energization levels are different voltage levels.

18. A gas valve having an adjustable relay assembly for operating the gas valve at a plurality of different output flow levels, the gas valve comprising an inlet and an outlet with a control valve therebetween, a regulator assembly for regulating gas flow from the inlet to the outlet, with the adjustable relay assembly operatively connected to the regulator assembly by a control arm and configured for operating the control arm to each of at least three positions, each position providing operation of the gas valve at a different output flow level;

the relay assembly further comprising a plurality of adjustment members for adjustable control of the plurality of flow levels.

19. The gas valve according to claim 18 further comprising a separate adjustment member provided for setting the flow through the gas valve as regulated by the control valve for each level of operation.

20. The gas valve according to claim 19 further comprising an energizable member for activating the relay assembly which thereby controls operation of the control valve, and wherein a different energization level is supplied to the relay assembly for each of the operating flow levels.

21. The gas valve according to claim 20 wherein the gas valve is configured for operating in conjunction with a plurality of gas types and the relay assembly provides three operating levels for any of the plurality of gas types.

22. A method of controlling operation of a gas valve having a regulator for regulating gas flow and providing at least three different output flow levels, the method comprising:

configuring a plurality of adjustment members to set at least three positions of a control arm, each position corresponding to a different output flow level;

using an adjustable relay to position the control arm into each of the positions set by the adjustment members, setting the gas flow at each of the output levels; and activating the regulator for operation at each of the output levels.

23. The method according to claim 22 wherein configuring a plurality of adjustment members further comprises configuring a different adjustment member for control of the gas valve at each of the output levels.

24. The method according to claim 23 further comprising energizing the relay at three different levels wherein each energized level corresponds to a different output level.

25. A method of controlling operation of a gas valve, wherein a plurality of output levels are provided, the method comprising connecting a three stage relay, for regulating gas flow through the gas valve, thereby providing three different operating levels with each operating level providing a different output level, and energizing the relay at three different energization levels to move a control arm into three different positions for regulating the gas flow, each position corresponding to a different output level.

26. The method according to claim 25 further comprising setting the level of gas flow provided by the three stage relay at each of the output levels.

27. A controller for operating a gas valve at three different flow levels, the controller comprising:

a single control arm pivotally connected to the gas valve;

a first adjustment means for providing a first flow level through the gas valve using the control arm;

a second adjustment means for providing a second flow level through the gas valve using the control arm; and a third adjustment means for providing a third flow level through the gas valve using the control arm.

28. In combination with a heating system having a furnace and a blower for providing heat to a building, wherein the furnace includes a gas valve, an improved relay control operating in conjunction with a regulator to provide three different operating levels of the gas valve, the improved relay control comprising a control arm connected to the gas valve and in conjunction with the regulator controlling the flow of gas through the gas valve, an energizable member providing movement of the control arm to thereby adjust the flow of gas through the valve, and three adjustment members which together with the control arm are configurable to stop the movement of the control arm to thereby define three different operating levels corresponding to the three different gas flow levels, and wherein the blower is operated at three corresponding levels.

29. The improved relay control of claim 28 wherein each of the adjustment member is configured to define a different operating level corresponding to a gas flow level.

30. In combination with a climate control system having a thermostat for controlling the operation of a furnace having a gas valve, a relay for operating the gas valve at three different output flow levels, the relay comprising a control arm connected to the gas valve for controlling the output flow levels and having three adjustable elements for defining the flow at each of the output flow levels provided by the control arm; wherein the control arm is positionable in three positions, each position corresponding to a different one of the output flow levels.

31. A gas valve with adjustable low, medium, and high flow rates, the gas valve including a regulator for changing the flow rate through the valve, a moveable control arm for operating the regulator, and a two stage solenoid for moving the control arm, a first adjustment member for adjusting the position of the control arm when the solenoid is off, to set the low flow rate, a second adjustment member for adjusting the position of the control arm when the solenoid is in its first stage, to set the medium flow rate, and a third adjustment member for adjusting the operation of the regulator by the control arm when the solenoid is in its second stage, to set the high flow rate.

32. A gas valve with three adjustable flow rates, the gas valve having a regulator for controlling the flow rate through the valve, a moveable control member for operating the regulator, and a coil with at least three magnetic energization levels, the control member assuming a first position when the coil is in its first energization level, a second position when the coil is in its second energization level, and a third position when the coil is in its third energization level, an adjustment mechanism for changing the first position of the control member to thereby adjust the first flow rate, an adjustment mechanism for changing the second position of the control member to adjust the second flow rate, and an adjustment mechanism for changing the effect of the control member on the regulator when the control member is in the third position to adjust the third flow rate.

33. A gas valve with at least three adjustable flow rates, the gas valve having a regulator for controlling the flow rate through the valve, a moveable control member for operating the regulator, and a coil with at least off, intermediate and full power, the control member assuming a first position when the coil is off, a second position when the coil is at intermediate power, and a third position when the coil is at full power, and an adjustment mechanism for adjusting the flow rate when the control member is in the first, second, and third positions.

34. The gas valve according to claim 33 wherein the adjustment mechanism comprises a first mechanism that changes the first position to adjust the flow rate in the first position.

35. The gas valve according to claim 34 wherein the adjustment mechanism comprises a second mechanism that changes the second position to adjust the flow rate in the second position.

36. The gas valve according to claim 34 wherein the adjustment mechanism comprises a third mechanism for changing the effect of the moveable control member on the regulator when the moveable control member is in the third position.

37. The gas valve according to claim 35 wherein the control member includes a mechanism for positional adjustment of the control member.

38. A gas valve having three separately adjustable gas flow rates, the gas valve having a regulator for controlling the flow rate through the valve, a moveable control member for operating the regulator, the moveable control member being resiliently biased to a first position corresponding to a first flow rate, a coil having at least low and high magnetic power levels, and a resilient stop engaging the control member in a second position at low power levels, corresponding to a second flow rate, and allowing the control member to move to a third position at high power levels, and a first adjustment mechanism for changing the first flow rate, a second adjustment mechanism for changing the second flow rate, and an third adjustment mechanism for changing the third flow rate.

39. The gas valve according to claim 38 wherein the first adjustment mechanism adjusts the position of the resilient stop to change the first position and thereby adjust the first flow rate.

40. The gas valve according to claim 39 wherein the second adjustment mechanism adjusts the position of the resilient stop, wherein the resilient stop engages the control member at low power levels, changing the second position to thereby adjust the second flow rate.

41. The gas valve according to claim 40 wherein the third adjustment mechanism adjusts the contact between the control member and the regulator when the control member is in the third position to adjust the third flow rate.

42. A controller for operating a gas valve to at least three different flow levels, the controller comprising:
a control member operating a regulator of the gas valve; and
an adjustable relay operating the control member to at least three different positions to provide at least three different flow levels;
the controller further comprising a plurality of adjustment members extending through the control member for setting a plurality of the different positions.

43. A gas valve having three separately adjustable gas flow rates, the gas valve having a regulator for controlling the flow rate through the valve, a moveable control member for operating the regulator, the moveable control member being resiliently biased to a first position corresponding to a first flow rate, a coil having at least low and high power levels, and a resilient stop engaging the control member in a second position at low power levels, corresponding to a second flow rate, and allowing the control member to move to a third position at high power levels, and a first adjustment mechanism for changing the first flow rate, a second adjustment mechanism for changing the second flow rate, and an third adjustment mechanism for changing the third flow rate;
wherein the first adjustment mechanism adjusts the position of the resilient stop to change the first position and thereby adjust the first flow rate; and
wherein the second adjustment mechanism adjusts the position of the resilient stop, wherein the resilient stop engages the control member at low power levels, changing the second position to thereby adjust the second flow rate.

44. The gas valve according to claim 43 wherein the third adjustment mechanism adjusts the contact between the control member and the regulator when the control member is in the third position to adjust the third flow rate.

45. A control for regulating the flow through a gas valve, the control comprising:
a flow regulator operated by the relative position of a single control arm operable about a pivot between at least three positions to select at least three flow rates; and
a plurality of adjustment members for setting at least three different flow levels through the gas valve as regulated by the flow regulator using the control arm;
wherein a first adjustment member is configured in combination with the flow regulator to provide a first flow level through the gas valve, a second adjustment member is configured in combination with the flow regulator to provide a second flow level through the gas valve, and a third adjustment member is configured in combination with the flow regulator to provide a third flow level through the gas valve.

46. The control according to claim 45 further comprising an energization member for activating the flow regulator to thereby provide each of the flow levels, and wherein a different energization level is provided for each of the flow levels.

47. The control according to claim 46 further comprising a connection member for connecting the control arm to the gas valve.

48. The control according to claim 47 further comprising a biasing member connected to the control arm.

49. In combination with a gas valve having a regulator, a relay assembly providing three different gas valve output levels, the relay assembly comprising:
a single control arm configured for operation in conjunction with the regulator for providing the three different gas valve output levels; and
a plurality of adjustment members in combination with the control arm, the adjustment members configurable to set the relay at the three different gas valve output levels; wherein a first adjustment member is configured to set a first gas valve output level, a second adjustment member is configured to set a second gas valve output level, and a third adjustment member is configured to set a third gas valve output level.

50. The relay assembly according to claim 49 wherein the adjustment members are adjustable screws, each of which is settable within a range for configuring each of the gas valves output levels.

51. The relay assembly according to claim 49 further comprising an energizable member configured to activate at different energization levels, and in conjunction with the adjustment members, to provide for operating the gas valve at each of the gas valve output levels corresponding to a different energization level.

52. The relay assembly according to claim 51 wherein the different energization levels are different amperage levels.

53. The relay assembly according to claim 51 wherein the different energization levels are different voltage levels.

54. A gas valve having an adjustable relay assembly for operating the gas valve at a plurality of different output flow levels, the gas valve comprising an inlet and an outlet with a control valve therebetween, a regulator assembly for regulating gas flow from the inlet to the outlet, with the adjustable relay assembly operatively connected to the regulator by a control arm and configured for operating the control arm to each of at least three positions, each position providing operation of the gas valve at a different output flow level; wherein the relay assembly further comprises a plurality of adjustment members for adjustable control of the plurality of flow levels; the gas valve further comprising a separate adjustment member provided for setting the flow through the gas valve as regulated by the control valve for each level of operation.

55. The gas valve according to claim 54 further comprising an energizable member for activating the relay assembly which thereby controls operation of the control valve, and wherein a different energization level is supplied to the relay assembly for each of the operating flow levels.

56. The gas valve according to claim 55 wherein the gas valve is configured for operating in conjunction with a plurality of gas types and the relay assembly provides three operating levels for any of the plurality of gas types.

57. A method of controlling operation of a gas valve having a regulator for regulating gas flow and providing at least three different output flow levels, the method comprising:

using an adjustable relay to position a control arm into at least three positions, each position corresponding to a different output flow level, setting the gas flow at each of the output levels; and activating the regulator for operation at each of the output levels;

wherein setting the gas flow at each output level further comprises configuring a plurality of adjustment members to thereby provide each of the output levels;

wherein configuring a plurality of adjustment members further comprises configuring a different adjustment member for control of the gas valve at each of the output levels.

58. The method according to claim 57 further comprising energizing the relay at three different levels wherein each energized level corresponds to a different output level.

* * * * *